United States Patent

[11] 3,599,179

[72] Inventor Wayne E. Arnold
 Murrysville, Pa.
[21] Appl. No. 828,625
[22] Filed May 28, 1969
[45] Patented Aug. 10, 1971
[73] Assignee Westinghouse Electric Corporation
 Pittsburgh, Pa.

[54] FAULT DETECTION AND ISOLATION IN COMPUTER INPUT-OUTPUT DEVICES
 20 Claims, 6 Drawing Figs.
[52] U.S. Cl. ................................................. 340/172.5,
   235/153
[51] Int. Cl. ................................................. G06f 11/00
[50] Field of Search ........................................ 340/172.5,
  146.1; 235/157, 153; 324/28, 73

[56] References Cited
UNITED STATES PATENTS

| | | | |
|---|---|---|---|
| 3,105,935 | 10/1963 | Sjostrom .................. | 324/28 |
| 3,248,721 | 4/1966 | Cockrell et al. ............ | 324/73 X |
| 3,492,572 | 1/1970 | Jones et al. ................ | 324/73 |

Primary Examiner—Raulfe B. Zache
Attorneys—F. H. Henson, R. G. Brodahl and J. W. Wigert, Jr.

ABSTRACT: Computer-control systems, in addition to the computer itself, require various peripheral equipment to transmit computer commands to the process and to receive general and emergency information from the process. Failure of this equipment can cause serious malfunctions in the process. A system is disclosed for locating and isolating faults in these input-output devices before the controlled process gets out of control. This is accomplished by monitoring the back contacts of the relays or switch devices to see if the relays or switch devices have operated properly.

INVENTOR
Wayne E. Arnold

FAULT DETECTION AND ISOLATION IN COMPUTER INPUT-OUTPUT DEVICES

BACKGROUND OF THE INVENTION

This invention relates to a fault detection and isolation system for input and output devices associated with a computer.

With the advent of computerized process control systems, and in particular those which provide direct digital control, there has been considerable emphasis on systems reliability, availability, and security. This is particularly true in the areas of automatic mass transit, where human safety is essential, and also in petrochemical processing, where large amounts of materials are involved. This has led to several systems approaches: (1) redundant digital systems including system main frames and peripherals, and (2) digital supervisory and analog backup systems. Both of these approaches are very expensive.

Nevertheless, fault detection and isolation are still serious problems. Considerable work has been done in the area of programmed diagnostics to provide confidence in the system. Many of these utilize an external hardware countdown clock which must be reset by the computer. The program then requires the computer to be operating and at least the input-output multiplexing circuitry to operate, before reset of the clock can be performed. This is sometimes referred to as a "dead computer switch" program. Extensive central computer fault detection and computer transfer program techniques have been generated. Some central computer diagnostics even print out the card that failed.

However, even with redundant systems, manual takeover options, and with all present diagnostic software techniques, faults in the contact output and input circuits cannot be detected until after they have affected the process. Where human lives are at stake, as in a mass transit system, such a consequence might be disastrous. And even if the results are not disastrous, the troubleshooting required to determine what is wrong and to isolate the fault often requires far too much time.

SUMMARY OF THE INVENTION

It is, accordingly, an object of the present invention to provide an improved system which will better enable immediate fault detection, diagnosis, and isolation of computer input-output devices.

Another object of the present invention is to provide is improved fault diagnosis system which is more reliable and which will better maintain the desired isolation from the rest of the system.

Another object is to provide a fault detection system which will better detect faults in computer input-output devices before the process is affected.

Another object is to provide a fault isolation system which will provide increased availability through identification and printout to the maintenance personnel of the defective printed circuit card.

Another object is to provide a fault detection system which is self-checking to insure its own operability and to identify the failed circuit card if it is not operable.

DESCRIPTION OF THE INVENTION

Figure 1:
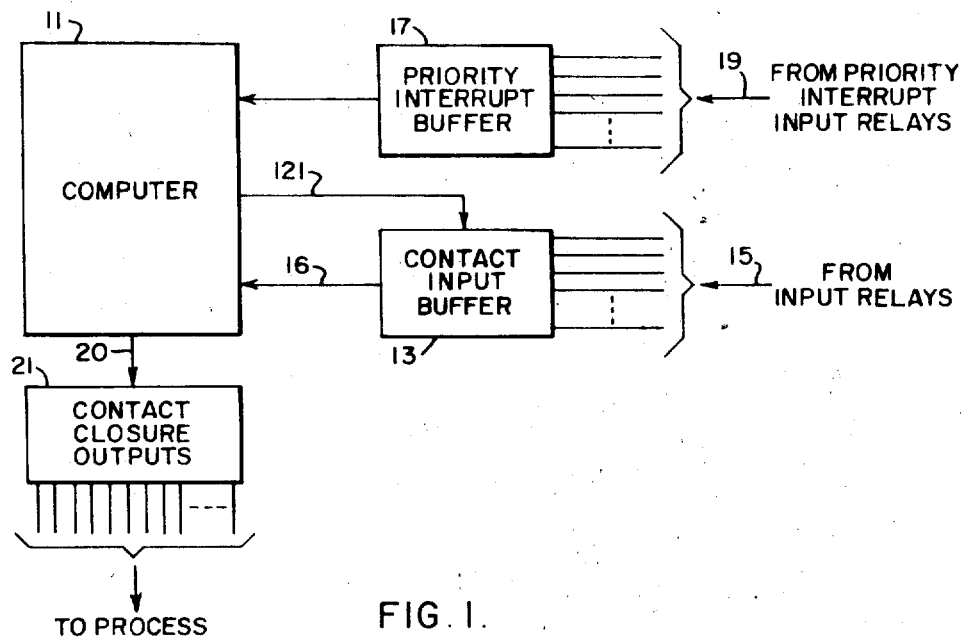
FIG. 1 is a general block diagram of a computer used to control a system or process, showing peripheral computer hardware.

FIG. 1 shows a block diagram illustrating a system for controlling a process, machine, or any other device where computer control is desired. A computer 11 makes decisions according to a computer program to control some process or device (not shown). To make these decisions external, information must be supplied to the computer. For example, suppose it is desired to control the speed and operation of an automatic train system. The speed, location, and other information regarding each train is picked up by sensors located throughout the system. Through the use of input relays, this information, in the form of coded signals including binary ones and zeros, is transmitted to a contact input buffer circuit 13 via a plurality of information lines, represented symbolically at 15.

A contact input buffer circuit, which will be described in more detail subsequently, converts the raw information from the input relays into a form suitable for use in the computer. The information is sent to the computer through a plurality of lines represented symbolically at 16 in FIG. 1. The contact input buffer also acts to isolate the input relays from the computer.

From the information provided via the contact input buffer 13, the computer can make appropriate decisions in operating some process, for example, an automatic train system. In some situations, however, it is mandatory that a particular piece of information reach the computer immediately, notwithstanding any input operations presently being carried out by the computer. In a train system for example, emergency information such as an impeding collision between two trains, a fire on a train, and the like, must be given to the computer immediately. To accomplish this objective priority input buffer circuits 17 are provided. Binary signals from priority interrupt relays associated with the emergency sensors are sent to a priority interrupt buffer circuit through one of the information lines indicated symbolically at 19. The priority interrupt buffer 17 then transmits this information to the computer 11. Because of the importance of the information arriving at the computer through the priority interrupt buffer 17, these signals will have priority within the computer over any signals arriving through the contact input buffer 13.

From the information obtained from the priority interrupt buffer 17 and the contact input buffer 13, the computer, in accordance with its program, will determine what changes should be made in the controlled process or device. In the example of the automatic train system, the computer may wish to instruct a particular train to speed up or slow down, to pick up another car, or the like. Contact closure outputs 21 receive these instructions via a plurality of lines represented symbolically at 20 from the computer 11 and in turn relay the information to the process.

In one particular form, the contact closure outputs are modular in design. Each module consists of a card holding seven relays. These relays or suitable switch devices will be discussed in more detail later. Each relay is set by the computer. Since the relays are bistable, one contact on the output side of the relay will always be "on" and one "off". If there are seven relays per card, then each card can be used as a 7-bit register; 2 cards for a 14-bit register; and so forth. If 14 bits are required for a word, then the computer will set all 14 relays on these two cards with the appropriate binary word. If only 1 bit is required only one relay will be set. The word is then sent to the train control system or the controlled process, where appropriate circuitry interprets the signal and performs the required operations.

Figure 2:
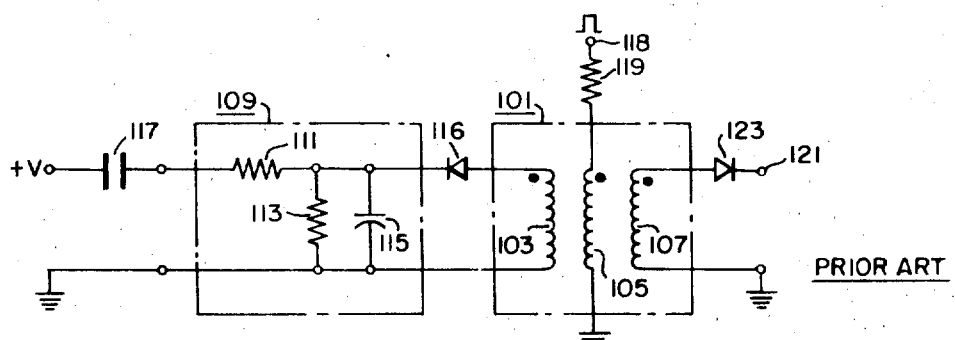
FIG. 2 is a schematic diagram of a well-known prior art isolation circuit used in computer input devices.

Contact input buffer circuits 13 consists of a number of identical transformer isolation circuits. One transformer is required for each bit of data applied to the computer input. Such a transformer circuit is shown schematically in FIG. 2. Typically, 14 of these circuits will be combined on a printed circuit board to form a contact input buffer module.

Isolation transformer circuit 101 consists of three windings: tertiary winding 103, primary winding 105, and secondary winding 107. Connected in parallel with the tertiary winding 103 is filter 109 consisting of resistors 111 and 113 and capacitor 115. When remote input relay contact 117 is closed, a voltage across capacitor 115 will build up as determined by the component values of resistors 111 and 113 and capacitor 115. Diode 116 prevents current from passing through tertiary winding 103 in the high impedance direction. When remote contact input 117 opens, the voltage across capacitor 115 will decay as determined by the values of resistor 113 and capacitor 115.

When the computer wishes to know the state of remote contact 117, it applies a high frequency pulse at 118 to the primary winding 105 through resistor 119. The path through which this pulse travels is represented by line 121 shown in FIG. 1. The voltage of the primary winding will be induced in either the secondary winding 107 or tertiary winding 103, depending upon their relative impedances. For example, if capacitor 115 is charged as a result of the closing of remote contact 117, tertiary winding 103 appears as a high impedance, and most of the pulse energy applied to the primary coil 105 is available at the secondary winding 107 to supply an output pulse at 121.

When the remote contact 117 opens, capacitor 115 will be discharged and will act as a short circuit across the tertiary winding 103. The pulse energy in the primary winding 105 under these conditions will be transferred to the tertiary winding 103, and utilized in charging capacitor 115; there will thus not be sufficient voltage available across the secondary winding 107 to produce a binary "ONE" signal at the output 121. Resistor 119 in series with the primary winding 105 provides current limiting. Diode 123 prevents a negative pulse output on inductive flyback.

Figure 3:
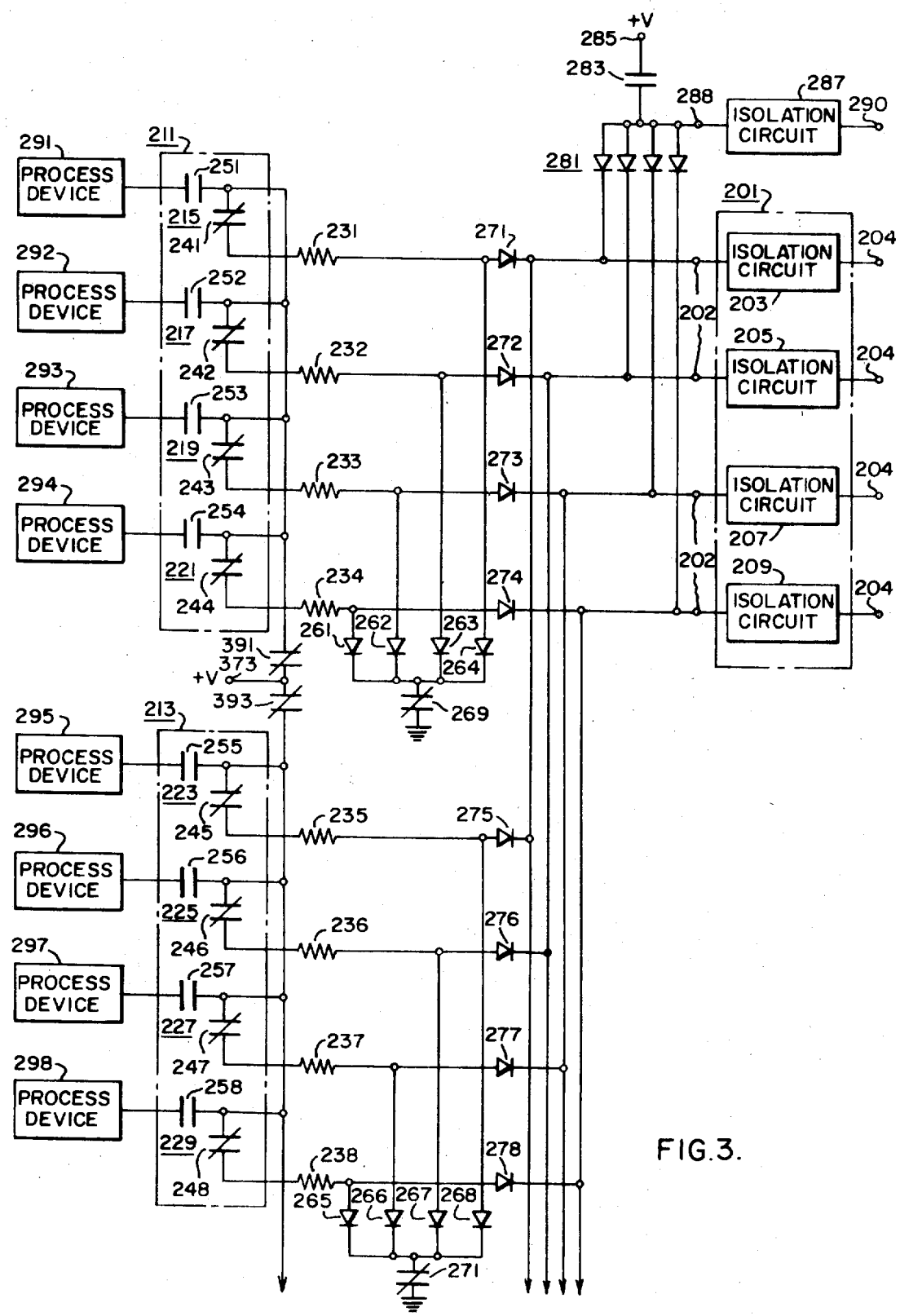
FIG. 3 is a schematic diagram of a fault detection and isolation circuit arrangement in accordance with the present invention for contact output closure devices associated with a process-control computer.

FIG. 3 is a schematic of the contact output fault detection circuit. Contact input buffer test card 201 is identical in construction with the contact input buffer 13 shown in FIG. 1. It consists of a number of transformer isolation circuits 203, 205, 207, and 209, each of which is identical in construction with the isolation circuit shown in FIG. 2 and described above.

Each isolation relay has an input terminal 202 and an output terminal 204. If no signal is provided at the input of one of the isolation circuits, the isolation circuit will provide a binary "ZERO" output signal. If a signal is provided at the input of an isolation circuit, it will provide a binary "ONE" output. For purposes of simplification, input buffer test card or module 201 is shown with only four isolation circuits, but it should be understood that a contact input buffer card may have a greater or lesser number of such circuits, the usual number being 14 per card.

Two modules, 211 and 213 make up the contact closure outputs. In actual practice one or more modules may be used, depending on the extent of the controlled process system involved. While normally each module holds seven relays, for purposes of explanation only four contact relays are shown per module, relays 215, 217, 219 and 221 in module 211 and relays 223, 225, 227 and 229 in module 213.

Figure 4:
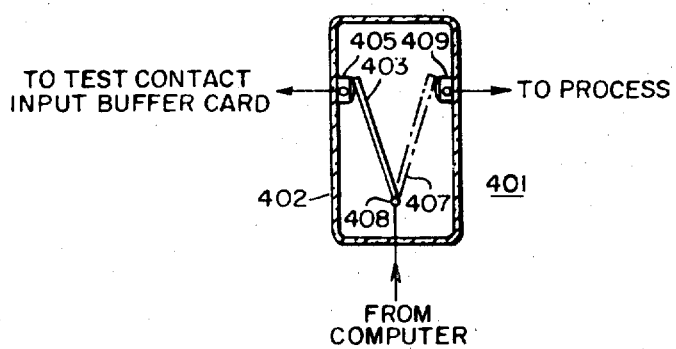
FIG. 4 is a cross section of a wetted-mercury contact relay utilized in the contact closure output device.

The important aspect of the invention is the isolation between the testing circuitry and the system itself provided by the use of the back contacts of the output relays. The back contact can best be described by reference to FIG. 4. Relay 401 is one of several identical relays making up a contact closure module. Relay 401 is a high-speed, mercury-wetted-type reed relay. It is magnetically biased for bistable operation and has make-before-break contacts with a bridging time of approximately 100 microseconds. The relays are surrounded by a hermetically sealed glass capsule 402 filled with an inert gas. The capsule is surrounded by a double wound operating coil (not shown). The capsule is potted in a high melting point wax and enclosed in a container which has provisions for printed circuit board mounting (not shown). When relay 401 is open i.e., when the current path from the computer to the process is open, relay armature 403 will contact 405. When the computer sends a signal to the process, armature 403 will move to the position as shown by dotted line 407 and will complete the circuit to the process via terminal 408 and process contact 409. It can be seen that when the armature is in this position, any circuit connected through the back contact 405 and terminal 408 will be broken. Similarly, when the armature is in the position shown at 403 in contact with back contact 405 the circuit to the process is broken. Thus at any given time the state of the back contact will always be the opposite of that of the process contact.

Referring to FIG. 3, back contacts are shown schematically as 241—248 and process contacts as 251—258. The back contacts are shown in a normally closed position and the process contacts in an open position.

Essentially, the present invention consists of providing means for "looking" at the state of the back contacts to determine whether the contact output relays (hereinafter referred to as CCO's) have functioned in accordance with the instructions of the computer. This is accomplished by "inputting" the back contacts into a contact input buffer test card and observing the output signal to see if the computer's instructions have been followed. By using a multiplexing arrangement only one contact input test card is required for a large number of CCO modules.

Multiplexing of the CCO modules into a single contact input buffer test card 201 is possible by the use of resistors 231—238, directional diodes 261—268, and contact multiplexing relays (hereinafter called CM relays) 269 and 271. Normally the CM relays are closed as shown, and hence no current reaches test contact input buffer card (hereinafter) referred to as the CB test module or card) 201 since a current path to ground is provided for each CCO module. For example, for CCO module 211 the path goes from voltage source 373, through the back contacts 241—244, resistors 231—234, directional diodes 261—264, and finally through CM relay 269 to ground. Thus, the input to each of the isolation circuits of the test CB card is "0" whenever all of the CM relays are closed. If, for example, the relays in module 211 are to be checked, CM relay 269 is opened. Thus, the current paths from voltage source 373, through back contacts 241—244, resistors 231—234, diodes 271—274, to the inputs 202 of isolation circuits 203, 205, 207 and 209 of CB test card 201 is no longer shorted out and current may be received at inputs 202 depending upon the state of the back contacts. Likewise, if the relays in module 213 are to be checked, CM relay 269 is closed and CM relay 271 is opened; the current paths from voltage source 373, through back contacts 245—248, resistors 235—238, diodes 275—278, to the input isolation circuits 203, 205, 207 and 209 of CB card 201 are no longer shorted out.

The sequence of operation for the test circuit is as follows. The process devices 291—298 will be energized or deenergized by the computer through the appropriate contact relay in module 211 and 213. Normally, all the CM relays, here 269 and 271, will be closed and the inputs to contact buffer 201 will be zero as explained heretofore. When the computer program outputs to close any of the contacts on any CCO module, it would also output to open the CM relay associated with that particular CCO module, thereby "inputting" the CCO module into the input buffer test card. For example, if the computer decided to energize process device 291 in FIG. 3, it would close contact relay 215, i.e., it would close process contact 251, thereby opening back contact 241, and at the same time open CM relay 269. After a few milliseconds delay, the computer would then read the output of the appropriate isolation circuit in CB test card 201, here isolation circuit 203. When relay 215 is energized, back contact 241 is opened and the current into isolation circuit 203 drops to zero, and a binary "ZERO" output should result.

If the output of isolation circuit 203 is still a "ONE," either relay 215 or isolation circuit 203 is faulty. At this point the computer would output to close CM relay 269 and thereby divert the current from isolation circuit 203 to ground. If the output of isolation circuit 203 stays at "ONE" it would know that isolation circuit 203 of the CB had failed. Conversely, if the computer reads a "ZERO," it would know the failure was in contact relay 215.

A similar procedure is followed where a closed contact relay is opened. If the computer commands to open a closed contact output relay it would also be programmed to open the CM relay for the appropriate CCO module, and again, after a few milliseconds, the output of the appropriate isolation circuit in the CB test card would be read. For example, if it is desired to deactivate previously closed relay 215, isolation circuit 203 should read a "ONE," since the back contact 241, now closed, provides a current of V373/R231 from the voltage source 373, to the input of isolation circuit 203. If the computer does not read a "ZERO," either the isolation circuit 203 of CB test card 201 or relay 215 of CCO module 211 is defective. Other CCO modules, such as module 213, can then be multiplexed into the CB test card and if other opened CCO relays do not yield "ONES," the probability is that the isolation circuit 203 is defective.

A more positive alternative for checking the integrity of CB test card 201 is also provided. A plurality of diodes 281 are connected at their cathode terminals to the inputs 202 of isolation circuits 203, 205, 207 and 209 in the direction as shown. The anode terminals of diodes 281 are connected through a test relay 283 to DC voltage source 285. To test the isolation circuits, test relay 283 is closed, thereby permitting current to flow to the inputs of each of the isolation circuits. If the isolation circuits are operating properly each of the outputs of the isolation circuits should indicate a binary "ONE." If any of the isolation circuits show a "ZERO" out then it must be faulty and CB test module 201 should be replaced.

The integrity of diodes 281 are checked by providing an additional isolation circuit 287 connected at its input 288 to the diode-side of test relay 283. If can be seen that if isolation circuit 287 outputs a binary "ONE" at output 290 when test relay 283 is opened, then either test relay 283 has failed or one of the diodes 281 has shorted and provided a current path from voltage source 373. If test contact 283 is closed isolation circuit 287 should read a "ONE;" if not, then relay 283 must have failed.

From the above description of the invention it can be seen that by monitoring the state of the back contacts of the contact relays, it is possible to detect an error in the output system before the process has gone out of control. By utilizing the back contacts, this system has the advantage that it provides for a means of testing the contact output relays while maintaining isolation from the process. By looking at the back contacts rather than the process contacts, it is highly unlikely that a malfunction in the fault detection circuit will cause a malfunction in the process. This tends to obviate one of the problems with building or adding to a system; namely, that the more components you have, the more likelihood there is of any given component failure, and hence the greater likelihood of a failure of the whole system.

Once it is determined that there exists a failure in one or more of the contact output relays, it is easy to replace the faulty contact relays because of the modular construction of the CCO's. For example, if it is determined that relay 215 is faulty, the operator merely removes the entire CCO module 211 and replaces it with a new module. This can be done quickly and with little interference with the operation of the system as a whole. Optional fault isolation contact relays 391 and 393 are provided to enable the computer to remove power from the faulty CCO module, thus enabling its replacement while still controlling the rest of the process.

It should be noted that shorts in some of the diodes of the fault detection circuit may not be diagnosed as such. However, the reliability of diodes is so much higher than for relays that possibility of error in diagnosis due to faulty diodes is practically negligible. To reduce even further such risks, series diodes could be added if desired.

Figure 5:
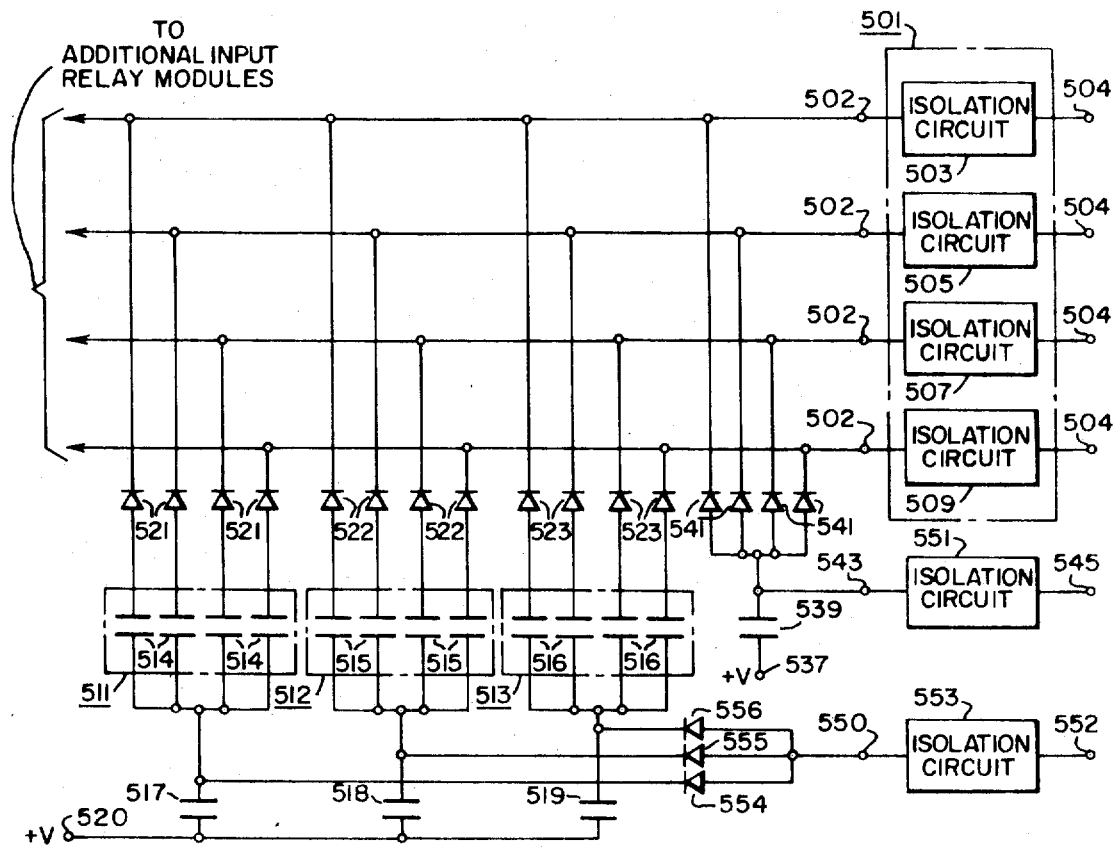
FIG. 5 is a schematic diagram of a fault detecting and isolation circuit for contact input buffer devices associated with a process-control computer.

Thus far, the invention has related to circuitry for checking the contact closure output 21 (FIG. 1). However, it is also of interest to know whether or not information from the process is being properly received through the input relays operative with the computer 11. Thus, it is important to know whether or not the contact input buffer 13 and the priority interrupt buffer 17 are operating properly. FIG. 5 shows schematically a check circuit for determining whether or not the contact input buffer is properly responding to input conditions from the process.

Shown in FIG. 5 is a contact input buffer consisting of a single CB module or card 501. Mounted on the module are four isolation circuits 503, 505, 507 and 509 each having an input 502 and an output 504. It should be understood that generally a CB module will consist of seven or as many as desired isolation circuits rather than the four as shown here. The number of four has been selected to simplify the description of the present invention. Further, the CB buffer may consist of more than one such module.

Due to the relatively high cost of a contact input buffer card, the binary information received from the input relays, located at or near the process, is multiplexed into the CB module. Three input relay groups 511, 512 and 513 are multiplexed into CB module 501. It is to be understood, however, that this particular number has arbitrarily been chosen and that in practice one, or any number of such input relay groups may be multiplexed into one or more CB modules.

Input relays 514 are arranged in group 511, relays 515 in group 512, and relays 516 in group 513. A terminal of each of input relays 514 is connected in common to a contact multiplexing relay 517 to voltage source 520, a terminal of each of input relays 515 is connected in common to a contact multiplexing relay 518 to voltage source 520, and a terminal of each of relays 516 is connected in common to a contact multiplexing relay 519 to voltage source 520. Connected to the other terminals of relays 514 are the anode terminals of diodes 521, to the other terminals of relays 515 are the anode terminals of diodes 522, and to the other terminals of relays 516 are the anode terminals of diodes 523. The cathode terminals of diodes 521, 522 and 523 are then connected to the respective inputs of isolation circuits 503, 505, 507 and 509 as shown.

Multiplexing relays 517, 518 and 519 are normally open as shown. When it is desired to supply information from an input relay group to the computer via the CB module, the multiplexing relay for that particular input relay group is closed. For example if the information from input relay group 511, in the form of binary "ONES" and "ZEROS" is to be sent to the computer, contact multiplexing relay 517 is closed. This provides a current path from voltage source 520 through the input relays 514 and the diodes 521 and the CB module 501. If an input relay is open, then no current will be received at the input of the appropriate isolation circuit and hence a binary "ZERO" will be sent to the computer. If an input relay is closed, then a current will be received at the input of the appropriate isolation circuit and a binary "ONE" will be transmitted to the computer. Diodes 522 and 523 prevent current from flowing back through contacts 515 and 516 respectively.

A second voltage source 537 is connected to a test relay 539 which is in turn connected to diodes 541. These diodes, in turn, are connected to isolation circuits 503, 505, 507 and 509 of module 501 permitting current flow in the direction as shown.

The sequence of operation for the contact input buffer test circuit is as follows: Normally test contact 539 is open and the input relays in group 511 are multiplexed into CB card 501 by applying voltage 520 to them through the contact multiplexing relays. When it is desired to check the contact input buffer module 501, the contact multiplexing relays 517, 518 and 519 are opened. The outputs of isolation circuits 503, 505, 507 and 509 should all be "ZERO," since no current can reach module 501 from either voltage source 520 of 537. If any of the outputs of the isolation circuits yield a "ONE," then either one of the contact multiplexing relays has failed or that particular isolation circuit is defective.

To determine whether or not a contact multiplexing relay or one of the isolation circuits has in fact failed, an additional isolation circuit 553 is provided. Group 511 is connected at the common terminal of input relays 514 to the input 550 of isolation circuit 553 via diode 554, group 512 via diode 555, and group 513 via diode 556. If the contact multiplexing relays 517, 518 and 519 are all open, it can be seen that the output 552 of the isolation circuit 553 should read a "ZERO." If, however, a binary "ONE" appears at the output then the error or fault must be in one of the multiplexing relays and not in the CB module 501.

The above check procedure is used to check the binary "ZERO" response of the isolation circuits. To test the binary "ONE" response, test contact 539 is closed, thereby applying the voltage 537 across each of the isolation circuits in module 501. The outputs of the contact buffer module are read again. This time, each isolation circuit should provide a "ONE" output because of the application of voltage 537 through diodes 541. If any output is a "ZERO" it indicates a defective isolation circuit and the computer can diagnose and print out this information.

Isolation circuit 551, having an input 543 connected to the anodes of diodes 541 checks for shorts in these diodes and for failure of test relay 539. When test relay 539 and multiplexing relays 517, 518 and 519 are opened the outputs of the isolation circuits of module 501 should read "ZERO." In the event that a short occurs across any of the diodes 541 when the multiplexing relays are closed or if there is a fault in contact 539, a "ONE" will be present at the output of 545 of isolation circuit 551 to indicate the failure.

The last check to be made is on the priority interrupt buffer 17 (FIG. 1). As noted earlier, the purpose of priority interrupt circuits is to inform the computer of certain events which are happening in the process which are of such an urgency that they require immediate attention by the computer. The computer does not solicit this information but rather the information is provided to the computer. Information sent via the priority interrupts will reach the computer regardless of what other information from the process is being received via the contact input buffer 13. Because of the emergency nature of the information from the priority interrupt input relays, a check can only be made on the priority interrupt buffer 17 if the sequence can be interrupted long enough to enable a test to be performed. Thus the following test circuit would only be used at a time and for a short enough period that the operation of the process would not be effected adversely.

Figure 6:
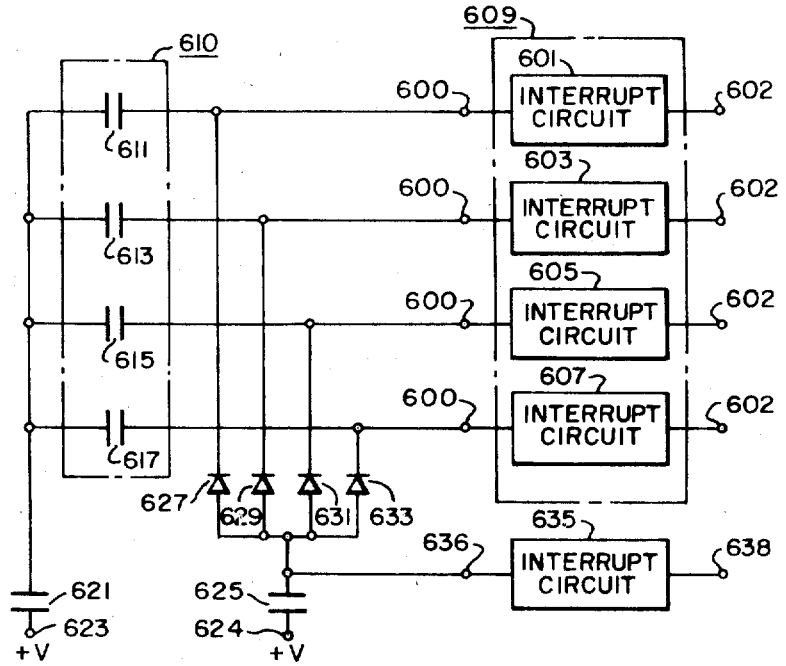
FIG. 6 is a schematic diagram of a fault detecting circuit for priority interrupt devices associated with process-control computers.

Referring now to FIG. 6, a group of interrupt circuits 601, 603, 605 and 607 are located on priority interrupt buffer module 609. The module 609 shown here contains only four interrupt circuits. However, it is to be understood that normally a module 609 consists of seven of such interrupt circuits. The number of four has been selected for convenience of explanation. The remainder of the check circuit is similar to that for the contact input buffer check circuit.

A group 610 of four priority input relays 611, 613, 615, and 617 are shown in FIG. 6. Again, the number four has been arbitrarily selected. Because of the importance of the information supplied from the priority input relays, these relays are not multiplexed into the priority interrupt module. Rather, input relays 611, 613, 615 and 617 are connected directly with the inputs 600 of interrupt circuits 601, 603, 605 and 607, respectively. The signal sent to the priority interrupt buffer module 609 is provided by voltage source 623. Test relay 621 is connected at one terminal to voltage source 623 and at the other terminal to a common terminal of the priority input relays 611, 613, 615 and 617.

Another voltage source 624 is connected through test contact relay 625 to the anodes of a plurality of diodes connected in parallel. The cathodes of diodes 627, 629, 631 and 633 are connected to the inputs 600 of interrupt circuits 601, 603, 605 and 607 of module 609 as shown. The test contact 625 is also connected as shown to the input 636 of an additional interrupt circuit 635. Interrupt circuit 635 also has an output 638.

The operation of the priority interrupt test circuit is very similar to the operation of the test circuit for the contact input buffer. Test relay 621 is opened to remove voltage 623 from the priority interrupt relays thereby isolating the priority interrupt buffer module 609 from the process. Test contact 625 is initially opened thereby preventing voltage from voltage source 624 from being applied across the priority interrupt circuits of module 609. At this point all of the interrupt circuits, i.e., 601, 603, 605 and 607 should read "ZERO" since no current should be able to reach these circuits from either voltage source 623 or 624. If any of the outputs 602 of the interrupt circuits yields a "ONE" then either one of the test contacts has failed or one of the priority interrupt circuits is defective.

If no "ONES" appear, test contact 625 is closed and the interrupt circuits 601, 603, 605 and 607 are read again to check the "ONE" response of the interrupt circuits. This time the outputs 602 should all be "ONES" since current flows directly from voltage source 624 through diode 627, 629, 631, and 633 to the priority interrupt module. If any of the interrupt circuits read a "ZERO" it indicates a defective interrupt circuit and the priority interrupt buffer module 609 can be removed and replaced with one which is not faulty. The interrupt circuit 635 like isolation circuit 551 in FIG. 5 has been included to determine whether there has been any diode shorting or to detect a failure in one of the test relays.

It should be noted that where high reliability is required silicon controlled rectifiers, commonly referred to as SCR's may be substituted for any or all of the test or multiplexing relays used in either the CCO test circuit, the CB test circuit; or the priority interrupt buffer test circuit.

The present invention has been described with a certain degree of particularity. However, it should be understood that various modifications and changes may be made within the scope and spirit of the present invention.

I claim:

1. Fault detection apparatus for determining the operability of a plurality of contact closure output switches during operation, each having a first state of operation and a second state of operation, said apparatus being operative with a digital computer including an instruction program in accordance with a desired state of operation for each of said switch, comprising:
    first means for sending a signal to each said switch;
    second means for sensing the state of operation of each said switches; and
    third means for providing the information as to the state of each of said switches to the computer for comparison with said instruction program to determine the operative state of each of said contact closure output switches.

2. Apparatus of claim 1 wherein the second means comprises:
    an input adapted to be connected with a DC voltage source;
    first electrical conductive paths between said input and said switches being tested; and
    second electrical conductive paths between said switches and the second means.

3. Apparatus of claim 2 wherein said second means and third means comprises a plurality of contact input isolation test circuits, each having an input connected to one of said switches during a predetermined state of operation, and an output adapted to be connected with the computer to send a first binary signal to the computer whenever there is a signal through said switch and second binary signal whenever there is a lack of a signal through said switch.

4. The apparatus of claim 3 including multiplexing means coupled between said switches and said second means wherein a plurality of said switches may be sensed by a smaller plurality of said contact input isolation test circuits.

5. Apparatus of claim 4 wherein the contact closure output switches are arranged in a plurality of contact closure output modules and said contact input isolation test circuits are arranged in a contact buffer module.

6. A system as in claim 5 wherein fault isolation means are coupled to said contact closure output modules respectively to provide isolation for any of said contact closure output modules whenever it is determined that a faulty contact closure output switch is located therein.

7. A system as in claim 5 wherein the multiplexing means comprises a plurality of normally closed multiplexing switches, each of said switches having a back contact and being associated with a contact closure output module and each having first and second terminals, the first being connected to ground; a plurality of diodes each having its forward terminal connected with an input of one of said plurality of contact input isolation circuits and having its blocking terminal connected to the second terminal of said multiplexing switch, and wherein any signals through the back contacts of any contact closure output module are directed from the inputs of the contact input isolation test circuits to ground whenever the corresponding multiplexing switch is closed.

8. A system as in claim 6 wherein the contact closure output switches are arranged in parallel within each of said plurality of contact closure output modules so as to require a single electrical path from said signal sending means to each module and wherein said fault isolation means comprises a normally closed fault isolation contact switch interposed between said input and each of said plurality of contact closure output modules to isolate any contact closure output module having a faulty contact closure output switch thereon from said signal sending means and thereby permitting the removal of the faulty contact closure output module from the system.

9. A system as in claim 3 including means coupled to said isolation test circuits for checking the electrical integrity of the contact input isolation test circuits.

10. A system as in claim 9 wherein the contact input isolation test circuits integrity checking means comprises:
a plurality of test diodes corresponding in number to said plurality of contact input isolation test circuits, each having a forward terminal and a blocking terminal, each blocking terminal being connected to the input of one of said plurality of contact input isolation test circuits;
a normally open test switch having first and second terminals, its first terminal being connected to the forward terminals of said plurality of test diodes and its second terminal being connectable with a direct current voltage supply such that when said test switch is closed current will be received at the inputs of said contact input isolation circuits and wherein the output response of each of said contact input isolation circuits will be a binary "ONE" if operable and a binary "ZERO" if inoperable.

11. A system as in claim 10 including an additional isolation test circuit having an input and an output, and wherein the input is connected to the diode side of said normally open test switch such that whenever said test switch is open the output of said additional isolation test circuit will provide a binary "ZERO" signal if said diodes and said test switch are operable and will provide a binary "ONE" signal whenever either one is inoperable.

12. In a computer-controlled process having a plurality of contact input isolation circuits, each having an input for receiving binary signals resulting from opening and closing one of a plurality of input switches connectable with a DC power source and located within the process, and an output for providing a first binary digit when no input signal is received and a second binary digit when an input signal is received, a system for detecting faults in the contact input isolation circuits comprising:
means for isolating the input of each of said plurality of contact input isolation circuits from the binary signals transmitted through the plurality of input switches;
means for monitoring the outputs of the plurality of contact input isolation circuits, wherein it can be determined that a contact input isolation circuit is inoperable if a second binary digit is read;
means for providing a test signal to each input of the plurality of contact input isolation circuits;
means for monitoring each of the outputs of the plurality of contact input isolation circuits wherein it can be determined that a contact input isolation circuit is inoperable if a first binary digit is read.

13. A system as in claim 12 wherein the plurality of input switches are arranged in parallel array respectively, to form a lesser number of input switch groups, wherein the contact input isolation circuits are arranged to form a contact input buffer module having a common input terminal, wherein the isolation means comprises means for opening all of a plurality of multiplexing switches, each of which is connected in series between the common input terminal of one of said contact input buffer modules and the DC power source, such that whenever a multiplexing switch is closed the binary signals are transmitted to the contact input buffer module from the input switch group associated with it.

14. A system as in claim 12 wherein the test signal providing means comprises:
a normally open test switch having first and second terminals, the first terminal being connectable with a direct current voltage source;
a plurality of diodes corresponding to the number of contact input isolation circuits, each having a forward terminal connected to the second terminal of said test switch and each having a blocking terminal connected to the input of one of said plurality of contact input isolation circuits; such that whenever said test switch is closed a signal is provided to the inputs of each of the contact input isolation circuits.

15. A system as in claim 14 including means for determining the integrity of the test signal providing means comprising a test signal input isolation circuit, having an input connected with the second terminal of said test switch and an output which provides a binary "ZERO" output signal whenever there is an absence of a signal at the input and a binary "ONE" output signal when there is a signal at the input, such that if a binary "ONE" signal is provided at the output of said test signal input isolation circuit when said test switch is ordered open, it is indicative that one of the elements of said test signal providing means is inoperable.

16. A system as in claim 13 for determining the operability of said plurality of multiplexing switches comprising:
test multiplexing input isolation circuit, having an input and an output, the output providing a binary "ZERO" output signal whenever there is an absence of a signal at the input and a binary "ONE" output signal when there is a signal at the input;
a plurality of diodes corresponding in number to the plurality of multiplexing switches, each diode having an anode terminal and a cathode terminal, each of the anode terminals being connected with a multiplexing switch and each of the cathode terminals being connected with the input of said test multiplexing input isolation circuit; whereas if a binary "ONE" output signal is provided at the output of said test multiplexing input isolation circuit when all of said plurality of multiplexing switches are ordered open, it is indicative that one of said multiplexing switches is inoperable.

17. A system as in claim 10 for determining the operability of the contact input isolation test circuit integrity checking means comprising: a test sensing and relaying input isolation circuit, having an input and an output, the output providing a binary "ZERO" output signal whenever there is an absence of a signal at the input and a binary "ONE" output signal when there is a signal at the input; the input being connected to the anode terminal of said plurality of test diodes, whereas, if a binary "ONE" output signal is provided at the output of said test sensing and relaying input isolation circuit when said test relay is ordered open, it is indicative that one of the elements of said contact input isolation test circuit integrity checking means is inoperable.

18. In a computer control apparatus having a plurality of priority interrupt circuits, each having an input for receiving binary signals resulting from opening and closing one of a plurality of input switches connectable with a DC power source and located within the process, and an output for sending a first binary signal when no input signal is received and a second binary signal when an input signal is received, a system for detecting faults in the priority interrupt isolation circuits comprising:
   means for isolating the input of each of said plurality of priority interrupt circuits from the binary signals transmitted through the plurality of input switches;
   means for reading the outputs of the plurality of priority interrupt circuits, wherein it can be determined that a priority interrupt circuit is operable if a second binary signal is read;
   means for providing a test signal to each input of the plurality of priority interrupt circuits;
   means for reading each of the outputs of the plurality of priority interrupt circuits wherein it can be determined that a priority interrupt circuit is inoperable if a first binary signal is read.

19. A system as in claim 18 wherein said test signal providing means comprises:
   a normally open test switch having first and second terminals, the first terminal being connectable with a direct current voltage source;
   a plurality of diodes corresponding to the number of priority interrupt circuits, each having an anode terminal connected to the second terminal of said test switch and each having a cathode terminal connected to the input of one of said plurality of priority interrupt circuits, such that whenever said test switch is closed a signal is provided to the inputs of each of the priority interrupt circuits.

20. A system as in claim 19 including means for determining the integrity of the test signal providing means comprising a test signal input interrupt circuit, having an input connected with the second terminal of said test switch and an output which provides a first binary output signal whenever there is an absence of a signal at the input and a second binary output signal when there is a signal at the input, such that if said second binary "ONE" signal is provided at the output of said test signal input interrupt circuit when said test switch is ordered open it is indicative that one of the elements of said test signal providing means is inoperable.